United States Patent [19]

O'Neill et al.

[11] Patent Number: 5,441,088
[45] Date of Patent: * Aug. 15, 1995

[54] LP GAS CAN AND GAS RECYCLING APPARATUS

[75] Inventors: Paul J. O'Neill, Novato, Calif.; Gary P. Wittig, Gardnerville, Nev.

[73] Assignee: Aervoe-Pacific Company, Inc. Nevada, Gardnervill, Nev.

[*] Notice: The portion of the term of this patent subsequent to Nov. 22, 2011 has been disclaimed.

[21] Appl. No.: 177,529

[22] Filed: Jan. 5, 1994

[51] Int. Cl.6 ............................................. B67B 7/00
[52] U.S. Cl. ................................. 141/51; 141/65; 141/97; 141/330; 222/87; 100/98 R; 100/902
[58] Field of Search ............... 141/7, 45, 51, 59, 65, 141/93, 95, 97, 329, 330; 29/403.1, 403.3, 403.4, 426.1, 426.3–426.6; 100/98 R, 215, 251, 902; 222/87

[56] References Cited

U.S. PATENT DOCUMENTS

| | | | |
|---|---|---|---|
| 4,349,054 | 9/1982 | Chipman et al. | 141/330 X |
| 4,407,341 | 10/1983 | Feldt et al. | 141/97 |
| 4,459,906 | 7/1984 | Cound et al. | 100/98 R X |
| 4,690,180 | 9/1987 | Gold | 141/51 |
| 4,917,313 | 4/1990 | Morris | 100/902 X |
| 5,151,111 | 9/1992 | Tees et al. | 141/59 X |
| 5,167,184 | 12/1992 | Rebecchi | 100/902 X |
| 5,181,462 | 1/1993 | Isaac | 100/98 R |
| 5,220,947 | 6/1993 | Cauquil et al. | 141/329 X |
| 5,275,214 | 1/1994 | Rehberger | 141/65 |
| 5,303,749 | 4/1994 | Strock et al. | 141/51 X |

*Primary Examiner*—J. Casimer Jacyna
*Attorney, Agent, or Firm*—Mark C. Jacobs

[57] ABSTRACT

A liquified petroleum gas (LP gas) can recycling apparatus which includes a first compacting portion which safely evacuates the can for recovery of any residual gaseous product therefrom, then compacts the can, discharges the slug now compacted for collection; and a second gas treatment portion which collects the residual gas, repressurizes it and stores it in a repressurized gaseous state. The apparatus is preferably operated in an automated fashion by compressed air.

25 Claims, 6 Drawing Sheets

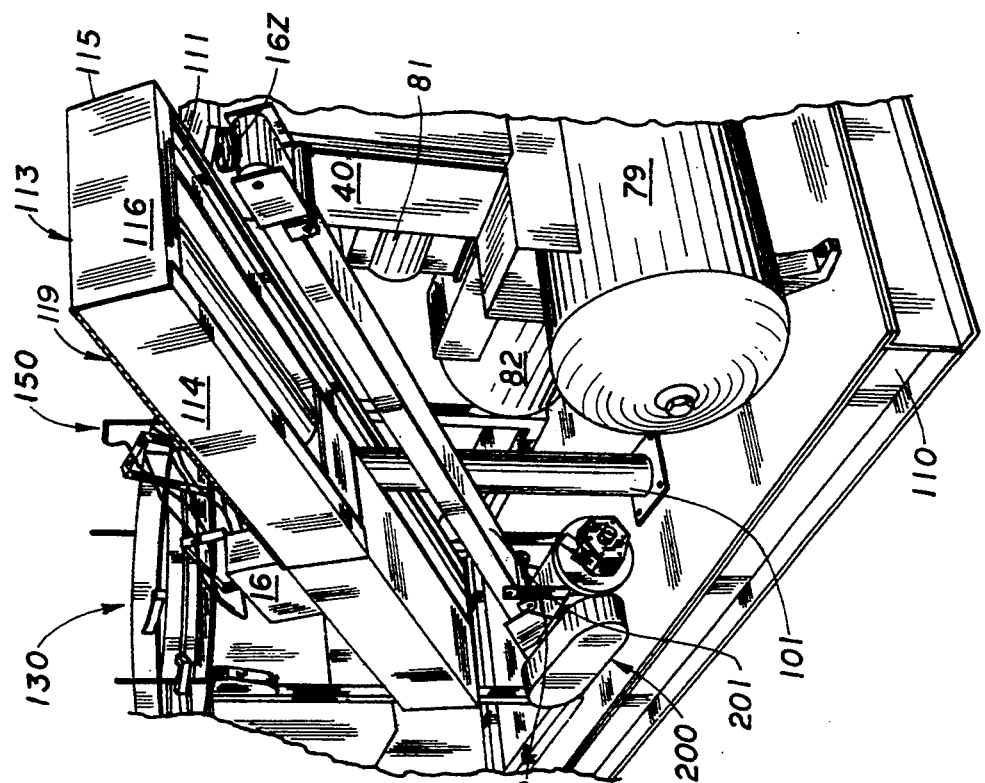
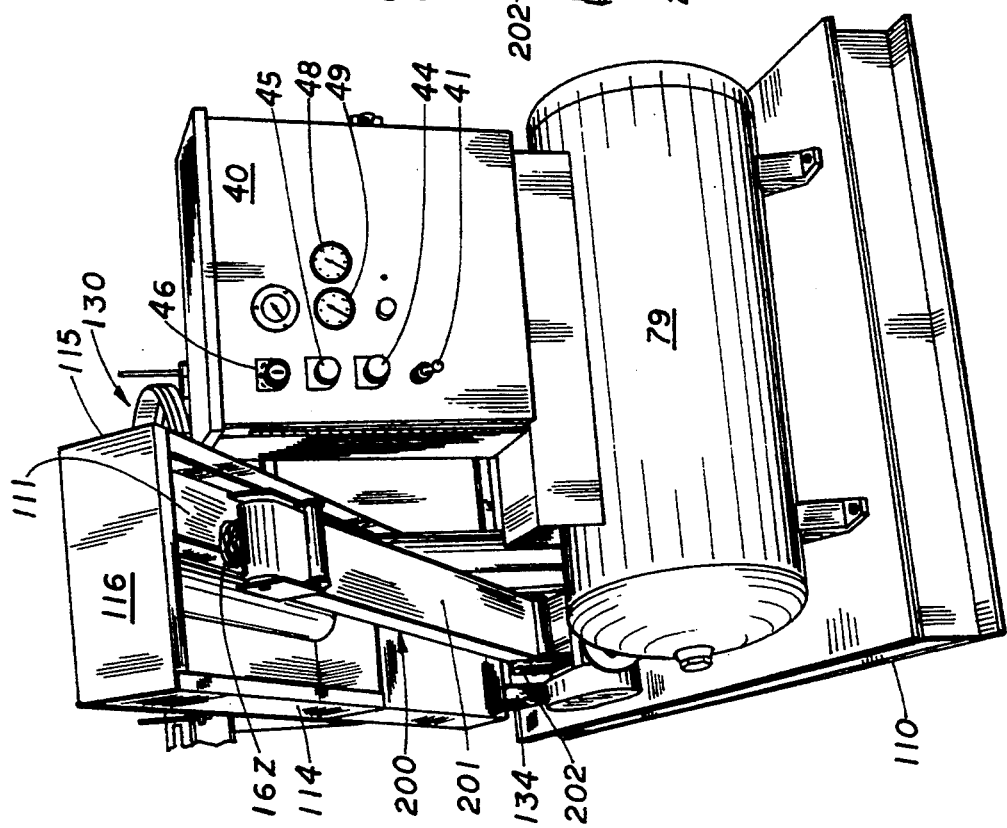
FIG. 6
FIG. 5

LP GAS CAN AND GAS RECYCLING APPARATUS

REFERENCE TO COPENDING APPLICATIONS

This application along with application Ser. No. 07/758 filed Sep. 12, 1991, now U.S. Pat. 5,322,093 are commonly assigned to Aervoe Pacific Company, Inc.

FIELD OF THE INVENTION

This invention relates generally to the field of fuel can compaction and to the recycling of cans used for liquified petroleum (LP gas) and the safe non-reliquification collection and storage of the residual fuel collected from such compacted cans.

BACKGROUND OF THE INVENTION

Aerosol dispensers have been available for a number of years for the application of hair sprays and other personal care products, as well as for paints, lubricants, insecticides and a multitude of other liquid products. LP gas (liquified petroleum gas) is sold over the counter in the U.S., Japan and other countries in such aerosol type dispensers.

In earlier times within the aerosol industry, "Freon" blends were widely used as propellants, principally because they were not flammable and were relatively nontoxic. After it was discovered that "Freons," when released into the atmosphere, migrated to the upper stratosphere and contributed to the depletion of ozone the U.S. Environmental Protection Agency (EPA) and similar agencies in other countries banned the further use of "Freon" propellants. This forced aerosol packagers to seek alternative propellant systems.

Among the newer propellants are the various hydrocarbons, consisting of propane, butane and isobutane and mixtures thereof. However, such hydrocarbon propellants are extremely flammable, and are in the chemical class known as volatile organic compounds.

In some countries such as Japan, these hydrocarbon compounds either singly or in mixtures are used not just as propellants, but as fuels, primarily for cooking. Thus cans of these aliphatic hydrocarbons with special valves thereon adapted to engage components of a cook stove to control the flow of the highly pressurized gas, are sold for household use.

Just as there is a problem in the aerosol packaging industry in the disposition of the used aerosol containers, particularly for large scale commercial users, so too is there a problem with the disposition of these spent fuel cans. After the cooking gas within the can has been essentially used up, the container retains some residual hydrocarbon gas. Since the cooking gas hydrocarbons, which act as both product and propellant as viewed from the perspective of those in the aerosol industry, constitute a flammable gas, the container from which they came is considered hazardous waste. For ease and simplicity, the term cooking gas as used herein is intended to mean LP gas, i.e., liquified petroleum gas; namely, $C_3$–$C_4$ hydrocarbons and blends thereof of varying vapor pressures.

There is a growing concern worldwide about the discharge of these gases into the atmosphere, whether they are used as propellants for other products or by themselves as fuels. In addition, Japan's regulatory system prohibits the reliquification of residual LP gas. There is a need therefore for a means to compact down the spent cans of cooking gas and to capture any residual cooking gas remaining within without reliquefying the gas. This invention provides a unique way to extract the residual cooking gas for recovery and possible re-use and permits the safe compaction of the empty can for recycling.

OBJECTS OF THE INVENTION

It is a first object of this invention to provide an apparatus for the efficient and safe recovery of residual liquified petroleum gas from spent cans thereof.

Another object is to provide for the recovery of the residual LP gas from cans thereof without reliquefying the pressurized gas.

A further object is to provide an apparatus to crush the spent can of LP gas in an air free environment, after the can has been evacuated of residual gas.

Yet another object is to provide a ram based compaction system for crushing a series of LP gas cans in rapid succession.

A still further object is to provide a single apparatus to ventilate a cooking gas can for the withdrawal of residual product and for the compaction of the container.

A yet further object is to provide an apparatus to collect residual LP gas and to compress it partially but short of reliquification, on the order of about thirty percent (30%).

Other objects of the invention will in part be obvious and will in part appear hereinafter.

The invention accordingly comprises the apparatus possessing the features properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

KNOWN PRIOR ART

Applicants are aware of the following U.S. patents, none of which anticipates or renders obvious the invention of this application:

| | | |
|---|---|---|
| Cound et al | 4,459,906 | July 17, 1984 |
| Chipman et al | 4,349,054 | September 14, 1982 |
| Kidson | 3,835,768 | September 17, 1974 |
| Feldt et al | 4,407,341 | October 4, 1983 |
| Clinton | 4,396,340 | August 2, 1983 |

SUMMARY OF THE INVENTION

A liquid petroleum gas can recycling system having two portions, a can compaction portion and a gas treatment portion. The compaction portion of the apparatus comprises a pair of opposed pistons, the first of which is for piercing a can having residual cooking gas (liquified petroleum gas) therein, for the evacuation of this residual gas product and the second of which pistons is for crushing the can after the evacuation, both of which actions transpire within a sealed compaction chamber in an air free environment. A passageway is provided from the compaction chamber for the depressurized gas contents to leave the chamber for collection by the second portion of the invention, while still in the gaseous state, recompression short of reliquification and for the storage of the gas.

BRIEF DESCRIPTION OF THE DRAWINGS

FIG. 5 is a left end elevational view thereof.

FIG. 6 is a left end perspective view of the apparatus of this invention.

DESCRIPTION OF PREFERRED EMBODIMENT

As noted earlier, the strict regulations of the Japanese government which forbid the reliquification of LP gas creates the need for a complex processing procedure for the safe handling and disposal of the extremely flammable remnants of the contents of the spent cans. The can compactor apparatus of this invention, is therefore operated entirely by compressed air due to the hazard of fire potential and will be discussed hereinbelow in detail. The present invention provides a mode of removal of any air from the presence of the LP gas processing stream that is to be ultimately collected in the gas holding tank as will be described. This helps to minimize the opportunity for explosion within the containment chamber or in any of the related tanks and piping. The associated gas recovery system used to reclaim the residual lower alkyl hydrocarbons from the can to be crushed, is also disclosed.

Considering the flammable nature of the products being processed the use of a nonelectric mode of operation provides a high measure of safety. This is enhanced by mounting the operational aspect 11 of the apparatus 10 to a support structure 12 to help ground the apparatus.

Figure 9:
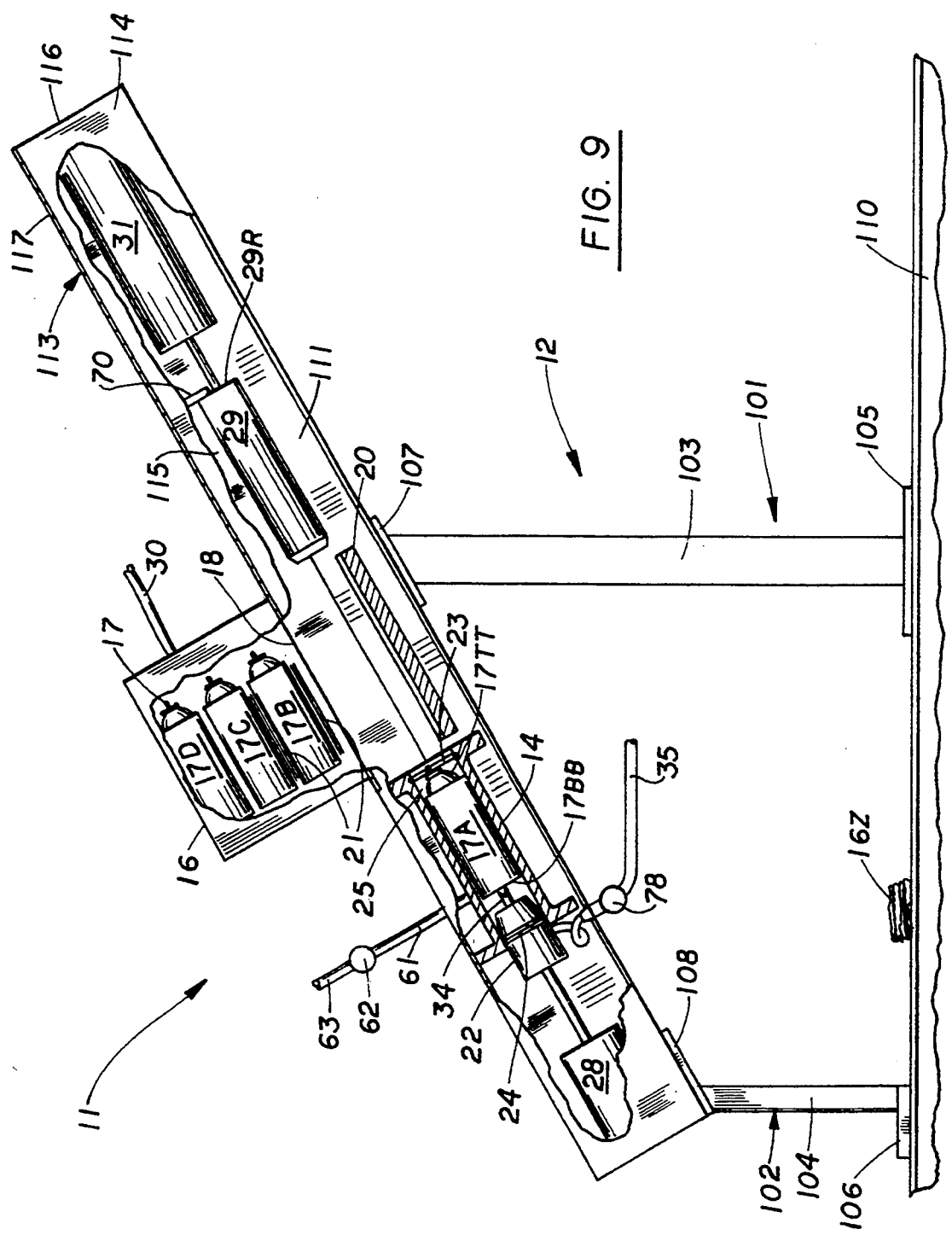
FIG. 9 is a right side elevational view of the can compaction components of this invention without the gas collection aspect of the invention.

Turning first to FIG. 9, wherein only the compaction aspect of the invention is seen due to the desire to simplify the understanding of the apparatus 10 and its structure for the reader, one notes that the support structure 12 includes a primary pedestal 101 and a secondary pedestal 102. Primary pedestal 101 comprises an elongated generally vertical leg, 103, mounted at its lower end to a base 105 and to an angled support 107 at its upper end.

Secondary pedestal 102 comprises a leg 104 of lesser elevation mounted on the lower end to a cross member 106, and to a second angled support 108, at its upper end. Both the primary pedestal 101 and the cross member 106 may be secured to skid 110. Cross member 106 is itself part of the support system for a rotary delivery table which will be described infra. Optional mounting holes, not shown, can be used to receive bolts, also not shown, to secure the apparatus 10 directly or as mounted to its skid to a permanent location if so desired, such as a concrete floor. Each of the angled supports 107, 108 are mounted to an I-beam 111 as by welding or via conventional bolts not shown. I-beam 111 serves as the main structural retaining means for the housing, 113, which is best seen in FIGS. 4, 6, and 7.

Figure 4:
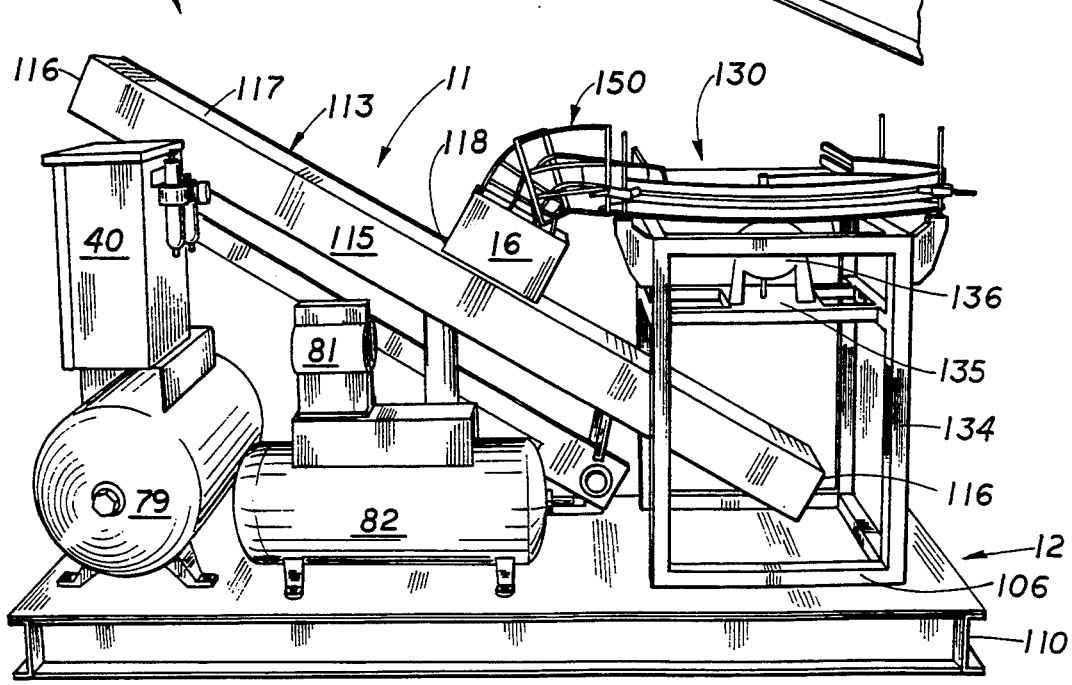
FIG. 4 is right side elevational view of the invention of this application.
Figure 7:
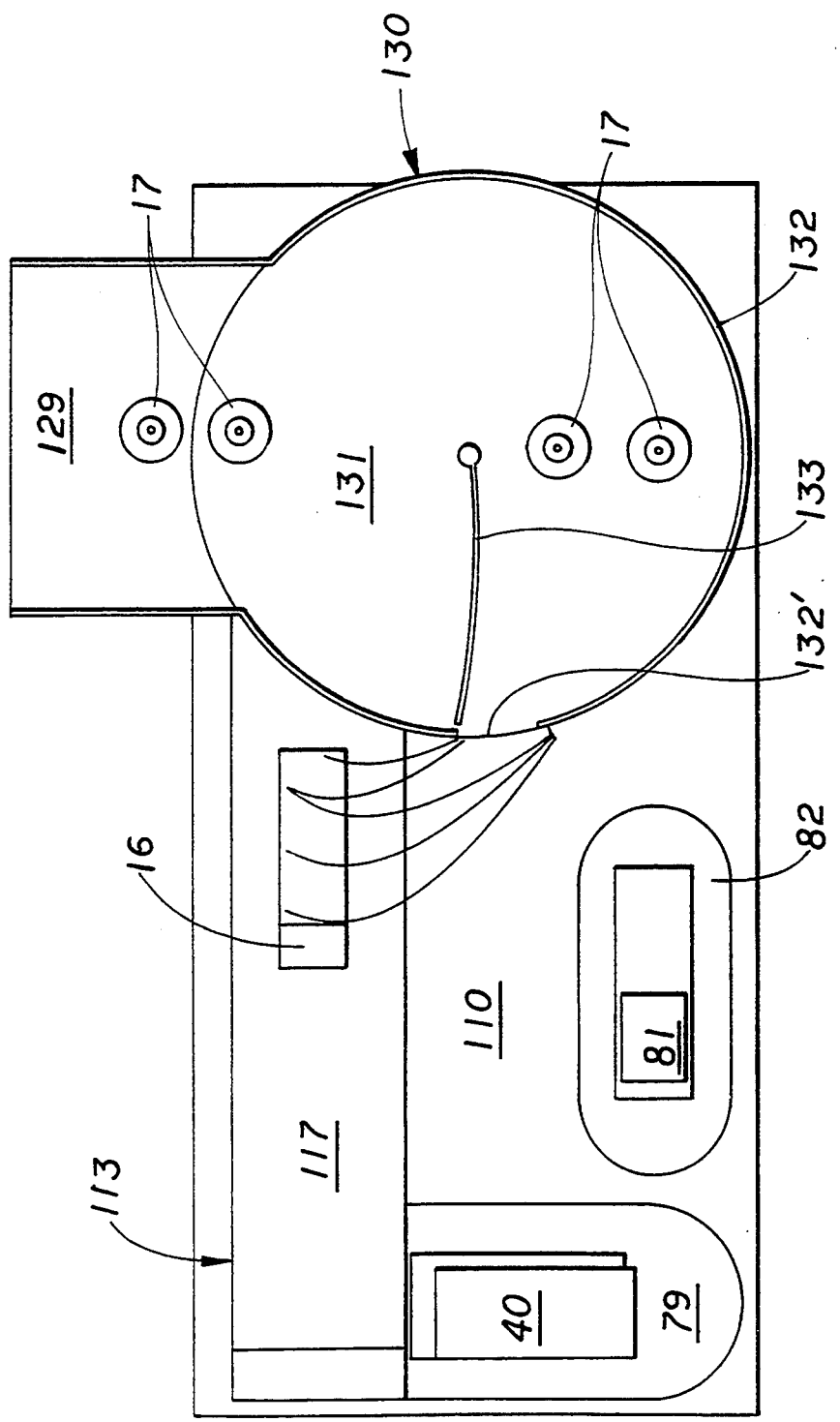
FIG. 7 is a diagrammatic top plan view of the apparatus of this invention.

With reference to FIGS. 4, 6, and 7, housing 113 is a generally elongated rectangular box having spaced side walls, 114, and 115; end walls 116, a top wall 117 having a cutout 118 for communication with the can feed hopper 16's open bottom, 18. See also FIGS. 1 and 9. The right side wall 114, as oriented from the rear of the apparatus, is preferably pivotally top mounted by a piano hinge 119 to the top wall 117. This side wall 114 may also contain a glass or polycarbonate window such that the procedure of the apparatus can be safely viewed during operation. All other walls are fixedly secured to one another. The housing is open at the bottom.

Figure 1:
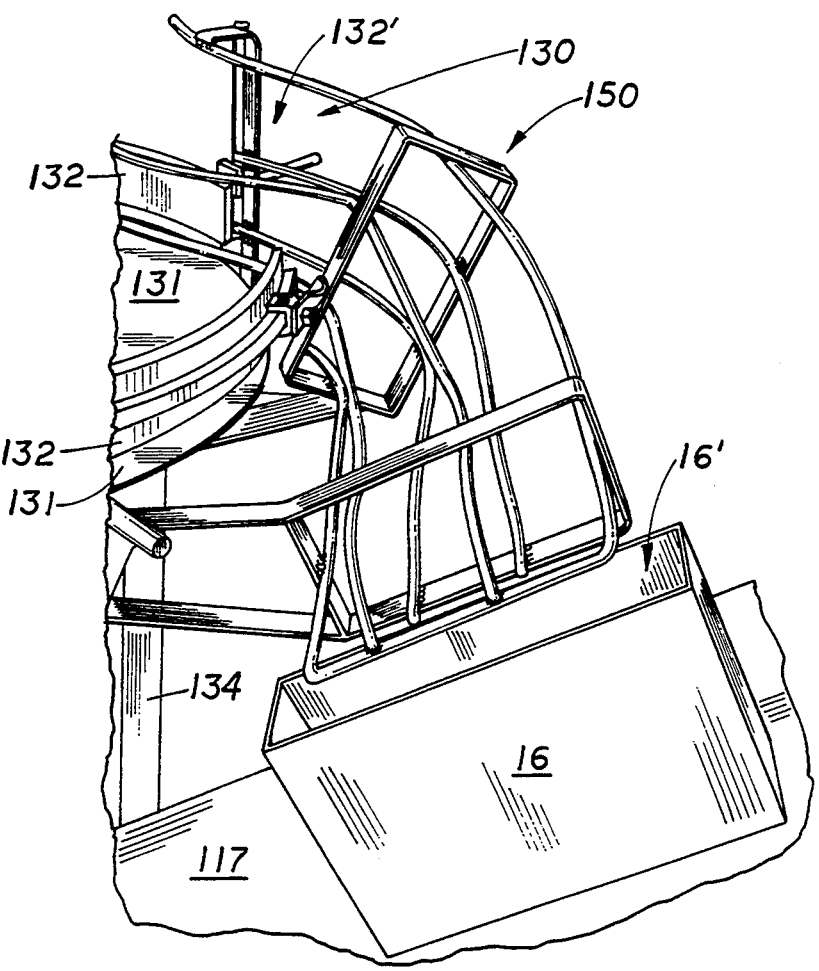
FIG. 1 is a perspective view of a portion of an optional rotary table and direction changer useable with the can compaction aspect of the apparatus of this invention.

Prior to discussing the actuation and operation of the apparatus commencing at the feed hopper 16, the reader is requested to view FIG. 7 and FIG. 1. Both figures show a rotary feed table 130 which comprises a mechanically rotatable round platform 131 disposed within a fixed upstanding peripheral wall 132, having a feed slot 132' per FIG. 1. A centrally pivoted guide arm 133 serves to direct upright cans 17 which are manually placed on the shelf 129 or directly on the table platform 131 toward the direction changer 150. The direction changer 150 is a bent spaced wire framework which is open at each end and is sized to be slightly larger in each direction than the can entering it and leaving it. It's opening is oriented horizontally at one end, and vertically at the other end. Direction changer 150 is mounted to the rotary table 130 per FIG. 1 and communicates with the open top 16' of hopper 16.

The balance of the structure of the rotary table 130, is seen in FIG. 4. This includes four (4) spaced legs 134 connected together at the bottoms thereof by three (3) cross members 106. One of said legs 134 can also be relocated to serve double duty, both as a leg for rotary table 130 and as a support leg 102 per FIG. 9. Disposed between, and secured to said legs, is a shelf 135 having a motor 136 thereon, which motor is connected to and provides the rotational force for the platform 131. Further discussion on the technicalities of and the operation of such a rotary table is not necessary as such units are readily available in the marketplace.

Figure 2:
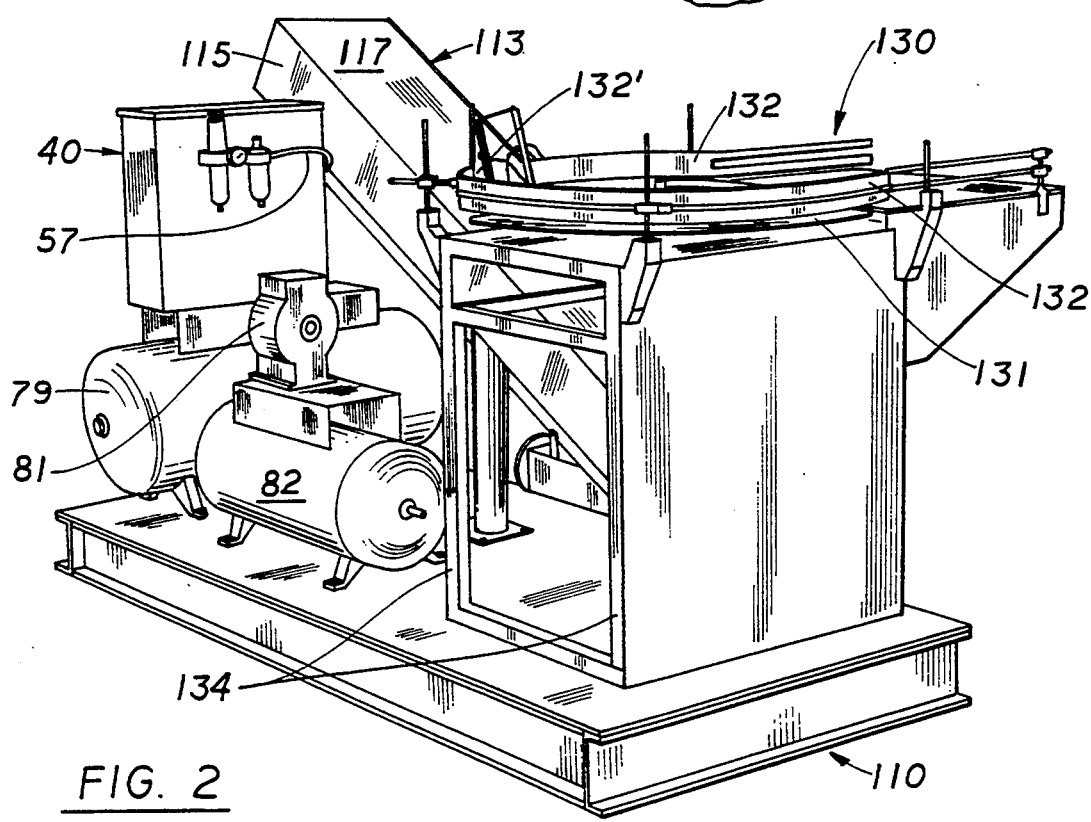
FIG. 2 is a right end perspective view of the can compaction aspect of the apparatus of this invention.

The discussion now turns to the compaction aspect of this invention. Hopper 16, which is open at the top, and which hopper is shown in cutaway in FIG. 9, is mounted in fixed position above the feed chute 20 disposed within the housing 113. The housing 113 is attached to the side of I-beam 111, which in turn is mounted to pedestal 101 as shown in FIG. 2.

Upon actuation, to be discussed in more detail infra, cans 17, previously placed in said hopper either manually or mechanically, as by having come from the rotary table 130 through the direction changer 150 are caused to lower one at a time from hopper 16 by a pneumatically controlled pair of feed blades 21, operated by air line 30, which blades release one can at a time from a series of aerosol type cans 17, in can hopper 16.

These two blades 21 are vertically aligned and run the length of the hopper, and are sequentially operated. That is, first can 17A when fed in will come to rest on the first of the blades 21. When actuated by the pneumatics, the first blade is withdrawn or retracts about 1.5 inches, to permit can 17A to fall to the lower or second of the two blades. When the second blade is actuated, it retracts about 1.5 inches, thereby permitting the first can 17A to fall from the hopper 16. But the first blade 21 will not be actuated a second time, until such time as the lower or second blade is back in its retainer position. Thus can 17B, the second can will be retained by the upper blade, until after can 17A is released by the lower blade, that is, the can leaves the hopper. When can 17B is released to fall from the first blade, to the second blade, the third can will be lowered for temporary retention by the first blade. This sequential operation of release the lower can, and then drop the upper can to the rest position sequentially to the lower blade 21 continues ad infinitum. Feed hoppers of this nature have been available in the marketplace for several years from applicants' assignee.

Thus an individual can, here can 17A, after being released by first the upper and second the lower blade, drops from the hopper 16's open bottom 18 onto the inclined feed chute 20. This inclination may be at about a thirty (30) degree angle to ensure a gravitational flow into the compaction chamber, 14.

Note that each of the individual cans 17 must be oriented with the top 17TT facing upwardly and the bottom 17BB facing leftwardly or downwardly to ensure proper operation of the apparatus. The slope of chute 20 allows can 17A to slide downwardly into compaction cylinder 14. This tubular compaction unit, 14, open at each end receives a can 17A to be first evacuated and secondly compacted in size.

In order to avoid any possibility of fire due to the highly flammable cooking gas being evacuated from the cans 17, compaction cylinder is fitted with a line 61 which enters the cylinder via bore 60 in the wall of said chamber. This line 61 is in fluid communication with a valve 62 connected to an unseen-in-this-figure source of vacuum. As will be explained with reference to FIG. 8, after the compaction chamber 14 is sealed—to be next discussed and just prior to piercing of the can's bottom, air is removed from the chamber such that if a spark occurs upon piercing of the can bottom 17BB, no flame will be supported.

Compaction chamber 14 is sealed off by a unique combination of seals. At the can entry end thereof an O-ring 23, protrudes slightly into the cylinder bore 25's interior. Piston 22 is slightly chamfered to ease entry into chamber 14 during operation. Piston 22's stroke is completed, when O-ring 24 which is mounted on the piston rearwardly of the chamfer, and which O-ring extends slightly beyond the diameter of the piston 22, comes into contact with the interior wall of the compaction chamber, 14. This effectuates a seal at the lower end.

At the upper end of the compaction chamber aka compaction cylinder 14, the aforementioned O-ring 23 effectuates closure once the compaction piston 29 seals against o-ring 23.

Figure 8:
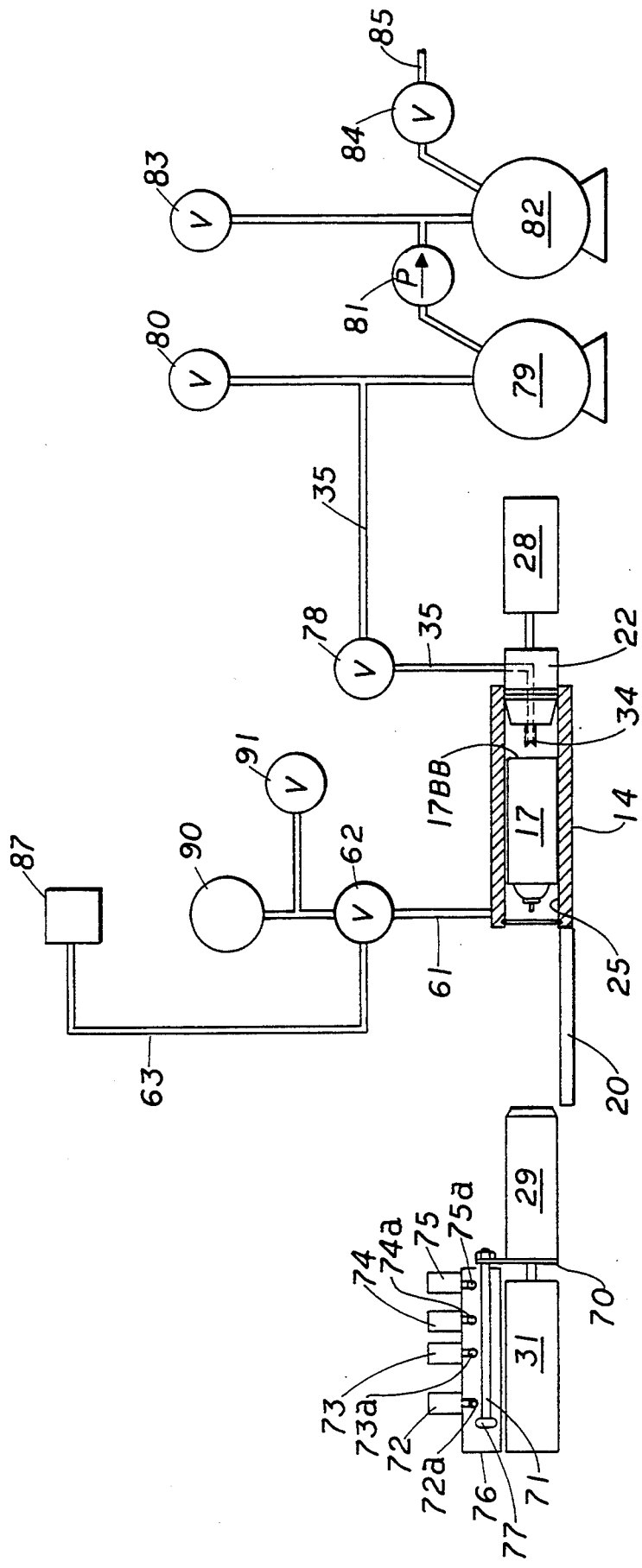
FIG. 8 is a schematic flow diagram illustrating the various components of this invention as they relate to the procedural steps involved in the evacuation, collection and storage of residual LP gas and the compaction of the LP gas can.

Note the presence of the cam rod adapter 70 mounted on the rear surface 29R of piston 29. The use of the adapter 70 will be discussed in connection with the valving of this invention as seen in FIG. 8, discussed infra.

First piston cylinder 28 upon actuation, urges piston 22 axially toward compaction cylinder 14 after impacting the can 17A preferably now lying in place in the compaction cylinder or if not, lying on the feed chute 20. The second cylinder 31, causes the compaction piston 29 to advance downwardly and to enter compaction cylinder 14 to effectuate a sealed connection.

Just before the entrapped can 17A, comes into abutted engagement with hollow penetrating needle 34, the air within the compaction cylinder 14 is removed by creating a vacuum therein. The piercing transpires, as the can 17A is progressively crushed by the advancing piston 29. The can bottom 17BB is forced onto the penetrating needle 34, which needle punctures the underside 17BB of the can 17A. The cooking gas, i.e., the hydrocarbons, if any, residual contents of can 17A exit through hollow needle 34 into line 35 for collection and/or recycling due to the pressure release within can 17A. The crushing continues until the advancing piston 29 has completed its predefined stroke to minimalize the can's spatial occupancy.

It is within the skill of the art to render the length of the compacting stroke adjustable to accommodate LP gas cans of different heights within the same apparatus, for complete crushing.

When a timed interval occurs coinciding with the complete compaction of can 17A, and evacuation of its content has been completed, piston 22 withdraws from cylinder 14, thereby permitting the now compacted can slug to drop free from the housing for collection.

While a waste bucket can be employed, it is preferable to employ a movable belt system 200, (see FIG. 6) such as those made by Hytrol Manufacturing Company of Arkansas to deploy the can slugs 16Z to large containers such as 55 gallon drums.

Briefly belt systems such as the model 4" slider bed unit of the type noted above are hydraulically operated, and include a rubber belt on two rollers. The can slugs such as 16Z, shown right at the top of the belt portion 201 of belt system 200 in FIGS. 5 and 6, drop from the compactor aspect of this apparatus onto the belt, journey along the belt 201, and then drop off the edge into a waiting container, not shown. Belt portion 201 is pivotally mounted to support 202 such that as one large drum fills, the belt system can be tilted or pivoted to drop its can slugs into a second 55 gallon drum. The construction of such pivotal mountings is within the skill of the art and need not be discussed at length in this application.

The discussion of the operation of the apparatus continues. Whereas in the application of O'Neill Ser. No. 08/155,487, filed Nov. 23, 1993 (Attorney Docket 1490-CIP) a valve located adjacent the lower or piercing piston 22 and actuated by contact of said piston 22, with an actuator at the time of the stroke terminus of compaction piston cylinder 31 directs both the piercing cylinder 28 and the compacting cylinder 31 to retract to their respective home positions in readiness for the next can drop cycle, the valving system of this invention is different since more steps are involved and is discussed infra.

Figure 3:
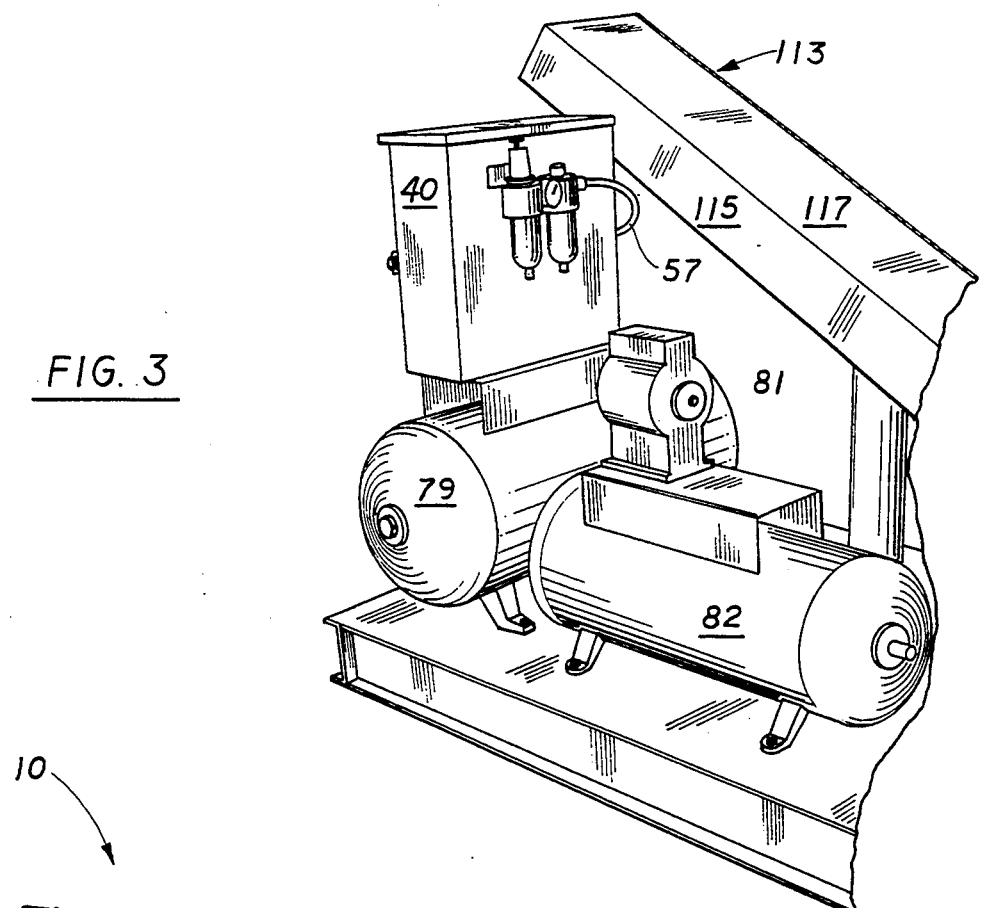
FIG. 3 is a right perspective close-up view of the tank portions of this apparatus mounted to the support structure.

The valve system here too is connected to the logic found in control box 40 (see FIG. 5) for operating the apparatus. Air line 57 which is seen in FIG. 3 is the master airline into control box 40. See the details below concerning control box 40.

The reader is now directed to FIG. 8 wherein the current valving system is shown. The reader's attention is drawn to the fact that the orientation of the pistons in FIG. 9 is reversed from FIG. 8. The cam rod adapter 70 mounted to piston 29 shown in FIG. 9 is seen here in FIG. 8 as well. The cam rod 71 is conventionally mounted at one end to the adapter 70 and most of the rod 71 is disposed within a tube 76 spaced from and mounted to side wall 115.

A series of four (4) valves 72, 73, 74, and 75 are disposed adjacent each other to be sequentially impacted for operation by cam rod 71 upon movement of piston 29. Each of these valves has its actuator 72a, 73a, 74a, and 75a preferably threadedly mounted through suitable openings, unnumbered in the tube 76, which tube may be of about 1" to 2" outside diameter. Impacter 77, upwardly disposed on the far end of the rod, impacts each of the valve actuators aforesaid as described above.

Valve 72 is similar to the valve of the commonly assigned application in that it serves to trigger a new cycle upon the full retraction of piston 29. But note the difference in operation orientation here, i.e., actuated by movement of the compression piston not the puncturing piston.

Valve 73, which is fluidly connected by a line not seen, to operate valve 62 which in turn serves to actuate the gas evacuation operation is seen in FIG. 8. Valve 73 opens when compaction piston 29 has formed its hermetic seal with cylinder 14.

Valve 62 is connected to line 63—FIGS. 8 and 9—is in turn connected to a conventional air operated vacuum generator, 87, per FIG. 8.

Upon actuation, the vacuum generator withdraws the air present in the compaction cylinder 14 to thereby eliminate or at least minimize the potential for fire from the ignition of the LP gas being evacuated. The travels of the evacuated gas will be discussed elsewhere herein.

Valve 74 which opens upon the advance of piston 29, serves to operate a 4-way shut off valve, 78, to thereby permit the evacuated gaseous LP gas to transfer via line 35 to the first tank 79. Tank 79 is equipped with a vacuum sensing valve 80 to maintain a vacuum in tank 79 through the control of diaphragm pump 81, which is seen only in FIG. 8. Diaphragm pump 81 is interposed between the first surge tank 79 and the holding tank 82. A conventional pump may be suitably employed.

Valve 75 initiates a time delay of up to 2 seconds to allow pressure to dissipate from the exhausted gas within compaction cylinder 14. After this rest period piston 22 starts to withdraw.

Also shown in FIG. 8 is the main or second tank 82 which is a holding tank for storage of recovered fuel in a partially pressurized but not reliquefied state. A pressure sensing valve 83 is in fluid communication with this tank to monitor the pressure in the tank. The valve is set to respond at about 18 P.S.I.G. if N-butane alone is the stored gas, which pressure is just below the liquefaction pressure of N-butane. Different set points are used for other gases or mixtures thereof. This sensing valve provides a pilot signal to open valve 84 to permit gas to exit tank 82 for reuse or for incineration.

In FIG. 3 and more particularly in FIG. 5, a control box 40 is shown mounted on one of the two tanks of the instant apparatus. It could also have been mounted to the underside of the shelf 135 of the rotary table 130, if desired.

Control box 40 includes a safety emergency stop control switch designated 41. The normal start button to operate the apparatus is switch 44. A multiposition multifunction switch 46 permits one of several operational modes to be selected as may be desired. Switch 45 operates the belt system 200. It is within the engineering skill of the art to build in any additionally needed switches and controls to timely stop the motion of the compaction piston 29, to control the period of air evacuation, the amount of vacuum and various other aspects of the operation of this invention as may be needed. Gauges 48, 49 indicate the pressure within the two gas tanks to be discussed infra.

GAS RECOVERY ASPECT

As has been noted this invention came about due to the existence of certain regulations which control LP gas reliquification in Japan and perhaps elsewhere as well. Thus when a spent can of this fuel with residual fuel still therein is introduced into the compaction chamber as discussed above, the chamber becomes sealed on each end and air is evacuated from within the confines of this chamber which is sealed off by piston movements from opposite ends. As the compaction cylinder 29 travels, the cam rod 71 associated therewith impacts a series of valves. These valves 72, 73, 74 and 75 are sequentially operated.

When cylinder 29 forms its seal with the compaction cylinder 14, the first valve 72 opens. This output signal in turn opens valve 62 which provides communication between the vacuum accumulation tank 90, (see FIG. 8) and the compaction cylinder 14. Note that a vacuum sensing valve 91 is preferably employed on tank 90. This valve acts as a system safety interlock. In the event this valve does not sense the appropriate vacuum level, it will send a signal to the valve controlling the air flow to the compaction cylinder 29 to reverse direction, thereby interrupting the compaction cycle until such time as the fault is corrected.

The vacuum generator 87, maintains a vacuum in the aforesaid vacuum accumulator tank 90 in order to provide the shortest possible evacuation route for the air entrapped in cylinder 14 when it is sealed off.

As the compaction piston 29 advances, valve 73 is actuated to allow valve 62 to close before the can 17 impinges upon the hollow penetrating needle 34. At the same time cam activated valve #3; namely, valve 74 is activated to open valve 78 to thereby permit the gaseous fuel to transfer from the penetrated can 17 through needle 34 along line 35 past valve 78 into first tank 79, designated the surge tank.

The can's contents, here LP gas, once in the surge tank 79 expands and is then pumped by pump 81 to holding tank 82 from which it is then directed via pilot valve 84 out line 85 for reuse in some fashion. Pump 81 is calibrated to increase the pressure on the gas up to about thirty (30) percent. This increases the pressure on the fluid, but retains it for storage in a gaseous state rather than as a liquid. The result of this increased pressurization is that the need for special permits in Japan as required for cooking gas producers is avoided, while the gas storage facility requirements can be reduced.

It is understood that only the essential aspects of the operation of the apparatus of this invention have been discussed. Every little valve and compressed air or other compressed fluid line needed to carry out the tasks to actuate this apparatus are not shown because the selection, placement implementation and actuation of same by air or pneumatic means are well within the realms of the skill of the art. It is also understood that the logic circuitry to carry out the functions described above are within the routine skill of the engineer.

In addition, many modifications and variations of the present invention are possible in light of the above teachings.

While the use of a feed table working in conjunction with a feed hopper having feed blades has been disclosed, it is also recognized that this table need not be employed and that a person can feed cans one at a time into the feed hopper and even directly—though not recommended—into the sealable compaction chamber. While the preferred mode as described above uses two vertically aligned feed blades, the requirement is for only one actuatable feed blade at a minimum.

Indeed, while the operation of the invention by compressed air is recommended, a hydraulically operated system is also envisioned. The key factor being, to avoid the presence of electricity which could cause a spark which could lead to a fire due to the presence of the highly combustible LP gas.

Since certain changes may be made in the described apparatus without departing from the scope of the invention herein involved, it is intended that all matter contained in the above description and shown in the accompanying drawings shall be interpreted as illustrative and not in a limiting sense.

We claim:

1. An LP gas can compaction and gas recycling apparatus comprising:
   I. a gas can compaction portion which comprises:
      a. a housing having a sealable compaction chamber closeable on each end, by a pair of opposed moving pistons, the first of which pistons includes a needle for piercing an LP gas can, and a second piston for crushing an LP gas can, all within said compaction chamber;
      b. means for evacuating air from the compaction chamber after sealing, prior to the needle of said first piston piercing a can located in said chamber;
      c. and a passageway from said first piston for evacuation of the fluid content of said LP gas can's contents from said compaction chamber; and
   II. means for collection and storage of residual LP gas collected from said passageway in fluid communication therewith.

2. An LP gas can compaction and gas recycling apparatus as described in claim 1 further including a feed means to supply cans to said sealable compaction chamber.

3. An LP gas can compaction and gas recycling apparatus as described in claim 2 wherein the feeding means comprises a feed hopper mounted on and in communication with said housing and having at least one actuatable feed blade to control the release of cans one at a time to the sealable chamber.

4. The apparatus of claim 2 wherein the feeding means comprises a rotary feed table connected to a direction changer, mounted to and in communication with a feed hopper having at least one actuatable feed blade to control the release of cans one at a time to the sealable chamber.

5. In the LP gas can compaction apparatus as described in claim 1 wherein said needle is hollow and mounted on said first piston, said hollow needle being in fluid communication with a fluid line, which together form said passageway out of said compaction chamber.

6. An LP gas can compaction and gas recycling apparatus as described in claim 1 wherein said pistons enter said compaction chamber axially to seal said chamber during compaction, one of said pistons having a cam rod adapter mounted thereon for receipt of a cam rod.

7. The apparatus of claim 6 further including a cam rod connected at one end to said cam rod adapter, the other end having an impacter thereon for valve actuation and a series of timing valves sequentially actuated by the impacter of said cam rod.

8. In the apparatus of claim 1 further including crushed can slug collection means associated with said apparatus.

9. In the apparatus of claim 8 wherein the crushed can slug collection means is a pivotally mounted endless belt system adapted to receive the crushed can slugs and transport them to collection containers.

10. The apparatus of claim 1 wherein II, the means for collection and storage of residual LP gas collected from said passageway comprises a first surge tank in fluid communication with said passageway from said second piston for temporary storage of residual LP gas, and a second holding tank for more permanent storage with a pump disposed in fluid communication therebetween for pumping gas from said first tank to said second tank, said pump being calibrated to increase the pressure on the gas being pumped to reduce spatial requirements, but at a pressure below the point of reliquification of the gas in said second tank 11. An LP gas can compaction and gas recycling apparatus comprising:
   I. a gas can compaction portion which comprises:
      a. a housing having a sealable chamber closeable on each end, by a pair of opposed moving pistons, the first of which pistons includes a needle for piercing an LP gas can, and a second piston for (I) positioning an LP gas can for puncture by said first piston, and (II) crushing the positioned can all within said compaction chamber;
      b. timed means for evacuating air from the compaction chamber after sealing, prior to the needle of said first piston piercing a can located in said chamber;
      c. a valved passageway from said first piston for evacuation of the fluid content of said LP gas can's contents from said compaction chamber; and
   II. means for collection and storage of residual LP gas collected from said passageway in fluid communication therewith.

12. An LP gas can compaction and gas recycling apparatus comprising:
   I. a gas can compaction portion which comprises:
      a. a generally rectangular housing open at the bottom, and having a top opening in communication with a can feed hopper mounted thereon, said housing having a sealable compaction chamber closeable on each end, by a pair of opposed moving pistons, the first of which pistons includes a hollow needle for piercing an LP gas can, and a second piston for positioning an LP gas can for piercing by said first piston, and for crushing said can after piercing, all within said compaction chamber;
      b. a valved means for evacuating air from said compaction chamber, when said compaction chamber is sealed, and
      c. a passageway having a valve therein, leading from said first piston for evacuation of the fluid content of said LP gas can's contents from said compaction chamber; and II. means for collection and storage of residual LP gas collected from said passageway in fluid communication therewith.

13. In the apparatus of claim 12, further including a cam rod carried by one of said pistons, and a series of cam actuated valves for timing the sealing of said compaction chamber and the evacuation of air therefrom.

14. The apparatus of claim 13 further including a rotary feed table in communication with said feed hopper to supply cans thereto.

15. The apparatus of claim 12 wherein said valved means for evacuating air from said compaction chamber is air operated vacuum generator.

16. The apparatus of claim 12 wherein said housing includes a viewing window, and further wherein said housing is slopingly disposed upon an I-beam mounted to a pedestal, whereby a first piston moves angularly upwardly to pierce a can, and a second piston moves angularly downward to crush said can.

17. The apparatus of claim 12 wherein II, the means for collection and storage of residual LP gas collected from said passageway comprises a first surge tank in fluid communication with said passageway from said second piston for temporary storage of residual LP gas, and a second holding tank for more permanent storage with a pump disposed in fluid communication therebetween for pumping gas from said first tank to said second tank, said pump being calibrated to increase the pressure on the gas being pumped to reduce spatial requirements, but at a pressure below the point of reliquification of the gas in said second tank.

18. An LP gas can compaction and gas recycling apparatus comprising:
a gas can compaction portion which comprises:
  a. a housing having a sealable compaction chamber closeable on each end, by a pair of opposed moving pistons, the first of which pistons includes a needle for piercing an LP gas can, and a second piston for crushing an LP gas can, all within said compaction chamber;
  b. means for evacuating air from the compaction chamber after sealing, prior to the needle of said first piston piercing a can located in said chamber;
  c. and a passageway from said first piston for evacuation of the fluid content of said LP gas can's contents from said compaction chamber for collection and storage of the gas.

19. The apparatus of claim 18 including a feed means to feed cans into said compaction chamber, wherein the feeding means comprises a feed hopper mounted on and in communication with said housing having an actuatable feed blade to control the release of cans one at a time to the sealable chamber.

20. The apparatus of claim 19 further including:
  d. a cam rod actuated series of valves for controlling; the timing of the sealing, the evacuation of the air and the flow in the passageway, said cam rod being connected to one of said pistons.

21. An LP gas can compaction and gas recycling apparatus comprising:
I. a gas can compaction portion which comprises:
  a. a feed table in communication with a housing having a feed hopper mounted on and in communication with a sealable chamber there in, said chamber being closeable on each end, by a pair of opposed moving pistons, the first of which pistons includes a hollow needle for piercing an LP gas can, and a second piston for both positioning an LP gas can for piercing by said first piston, and for crushing said can after piercing, all within said compaction chamber;
  b. means, comprising an air operated vacuum generator, for evacuating air from the compaction chamber after sealing, prior to the needle of said first piston piercing a can located in said chamber;
  c. a valved passageway from said first piston for evacuation of the fluid content of said LP gas can's contents from said compaction chamber;
  d. a cam rod actuated series of valves for controlling the timing of the sealing, the evacuation of the air and the flow in the passageway, said cam rod being connected to one of said pistons;
II. means for collection and storage of residual LP gas collected from said passageway in fluid communication therewith.

22. The apparatus of claim 21 wherein II, the means for collection and storage of residual LP gas collected from said passageway comprises a first surge tank in fluid communication with said passageway from said second piston for temporary storage of residual LP gas, and a second holding tank for more permanent storage with a pump disposed in fluid communication therebetween for pumping gas from said first tank to said second tank, said pump being calibrated to increase the pressure on the gas being pumped to reduce spatial requirements, but at a pressure below the point of reliquification of the gas in said second tank.

23. An LP gas can compaction and gas recycling apparatus comprising:
I. a gas can compaction portion which comprises:
  a. a housing having a dual opposed moving piston sealable compaction chamber for crushing cans containing residual LP gas, said chamber having two closeable ends wherein one piston closes off one end of the chamber and pierces an LP gas can, and the other piston closes off the other end of the chamber and crushes the LP gas can all within the compaction chamber;
  b. means for evacuating air from the compaction chamber after sealing, but prior to the piercing and crushing in said chamber;
  c. a passageway from said chamber for evacuation of the fluid content of said LP gas can's contents; and
II. means for collection and storage of residual LP gas collected from said passageway in fluid communication therewith.

24. The apparatus of claim 23 wherein II, the means for collection and storage of residual LP gas collected from said passageway comprises a first surge tank in fluid communication with said passageway from said second piston for temporary storage of residual LP gas, and a second holding tank for more permanent storage with a pump disposed in fluid communication therebetween for pumping gas from said first tank to said second tank, said pump being calibrated to increase the pressure on the gas being pumped to reduce spatial requirements, but at a pressure below the point of reliquification of the gas in said second tank.

25. The apparatus of claim 16 or claim 17 or claim 22 or claim 24 further including a vacuum sensing valve associated with said first tank to maintain a vacuum in said first tank by control of the operation of said pump.

* * * * *